2,183,522

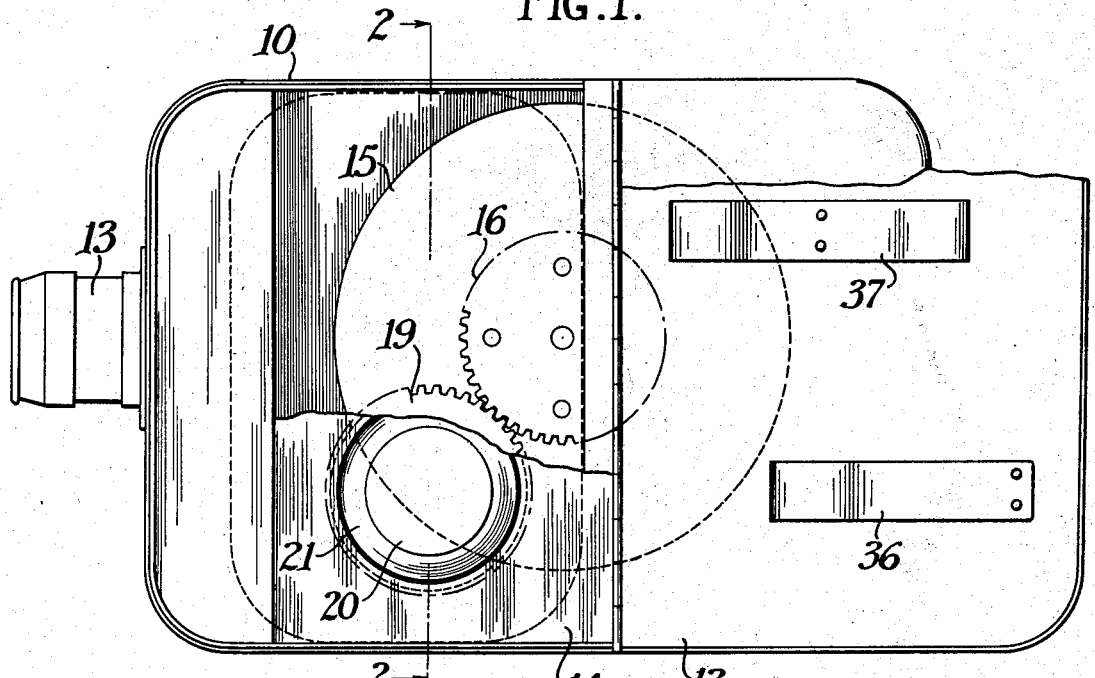
Dec. 19, 1939.     O. WITTEL ET AL     2,183,522
ANTIFRICTION SUPPORT FOR A FILM HOLDER AND A DRIVING
CLUTCH FOR MOTION PICTURE APPARATUS
Filed Sept. 23, 1937
Otto Wittel
Carter J. Hughey
INVENTORS Patented Dec. 19, 1939

UNITED STATES PATENT OFFICE 2,183,522

ANTIFRICTION SUPPORT FOR A FILM HOLDER AND A DRIVING CLUTCH FOR MOTION PICTURE APPARATUS

Otto Wittel and Carter J. Hughey, Rochester, N. Y., assignors to Eastman Kodak Company, Rochester, N. Y., a corporation of New Jersey Application September 23, 1937, Serial No. 165,374
In Germany September 25, 1936

6 Claims. (Cl. 242—55)

The present invention relates to a driving clutch for motion picture apparatus and more particularly to an antifriction support for a film holder to present an engageable face thereof for driving engagement with said clutch member.

In a motion picture apparatus, a driving clutch member, such as a take-up drive, is either mechanically or resiliently moved toward the driven film holder. Such mechanical or resilient movement of the driving clutch member creates considerable friction or binding between the film holder and its support and such friction is particularly undesirable in film holders of the magazine type.

The primary object of the present invention is the provision of an antifriction thrust bearing for a film holder to present the same for driving engagement with minimum friction between the film holder and its support.

Another object of the invention is the provision of a friction driving connection including plane surfaces in combination with an antifriction connection supporting the film holder including one of the said plane surfaces for such driving engagement. A further object is the provision of a film magazine including a film core having an engageable face and supported by an antifriction thrust bearing for engagement by a driving member.

Other and further objects of the present invention will be suggested to those skilled in the art by the description which follows.

The above and other objects are attained in a motion picture apparatus having a driving means in driving engagement with a detachable film holder and including an antifriction connection for maintaining said film holder with negligible friction in position for driving engagement with said driving means. The antifriction thrust bearing of the invention performs advantageously in association with driving clutch members between which there is positive engagement or between which there is merely frictional engagement of two plane surfaces. The latter type of clutch is preferable especially for a take-up drive because such clutch also permits slip between the members which otherwise must be separately provided.

Reference is hereby made to the accompanying drawing wherein similar reference characters designate similar elements and wherein:

Fig. 1 is a side elevation of a motion picture apparatus equipped with a driving means.

Fig. 2 is a vertical transverse section on the line 2—2 of Fig. 1.

Fig. 3 is a fragmentary section of a driving clutch providing positive engagement with the film holder.

Although the invention is herein described with respect to a motion picture camera, it shall be understood that said invention is equally applicable to all types of photographic or motion picture apparatus including a driving clutch for a film holder.

In the illustrated embodiment, the motion picture apparatus is enclosed within a housing 10 providing a magazine chamber 11 and carrying a hinged cover 12 for enclosing said magazine chamber 11. An objective assembly 13 is mounted on the front of housing 10. A mechanism plate 14 extends longitudinally of housing 10 and forms one side of said magazine chamber 11.

The driving means for the apparatus may be provided in conventional manner and may comprise a spring motor 15 rotatably mounted within housing 10 and carrying a driving pinion 16 and a driving assembly including a shaft 17 rotatably mounted within a bushing 18 in mechanism plate 14, carrying at one end a pinion gear 19 meshing with driving pinion 16 and carrying at the other end a driving part 20 preferably provided as a flat disc. Said driving part 20 is normally urged toward magazine chamber 11 by a resilient means such as a dished spring member 21. Since said driving assembly is axially movable under the influence of spring member 21, pinion gear 19 will move axially with respect to driving pinion 16 which, accordingly, is made thicker so as to engage at all times with pinion gear 19 in all axial positions of the driving assembly.

The detachable film holder is preferably, but not necessarily, provided as a film magazine. Such film magazine comprises a casing having a side wall 22, a lateral wall 23 and a cover 24. Said side wall 22 of the magazine casing is provided with an opening 25 through which the driven part of a film core 26 may extend. Said core 26 is provided with an annular groove 27 interengaging with a ring 28 formed inwardly from the side wall 22 to provide a light tight joint between said core and casing. Film core 26 is also provided with an axial hole 29 having a flat end wall 30, carries a film coil 31 and has a driven part 32 extending through opening 25 and preferably provided with a plane surface 33 which may be centrally concave as at 34.

The supporting means for the detachable film holder may comprise a spindle 35 extending into the axial hole 29 for support of the film core 26. In a magazine type of apparatus, said spindle 35 may be riveted to casing cover 24 opposite opening 25 and for supporting film core 26 with its driven part 32 at opening 25. In addition, the film magazine may in turn be supported within the magazine chamber 11 by a plurality of spring members. Such spring members may be supplied as a leaf spring 36 mounted on cover 12 and located preferably to bear on the end of spindle 35. A double leaf spring 37 may also be mounted on cover 12 to bear at two points on the upper portion of the film magazine and to hold it within magazine chamber 11 in the position indicated by dotted lines in Fig. 1.

Referring now to Fig. 2, it will be apparent that the plane surface of driving part 20 is resiliently urged by dished spring member 21 against the plane surface 33 of film core 26, leaf spring 36 acting to hold the film magazine in the position shown when the cover 12 is closed. The rotary driving motion of spring motor 15 is transmitted through the frictional engagement between said plane surfaces to the film holder or film core 26 for rotation of film coil 31. It is also evident that there will be considerable axial thrust upon film core 26 in order to provide the friction necessary to drive it. Consequently, an antifriction thrust bearing is provided according to the invention to present the film holder in position with minimum friction for such driving engagement.

The antifriction thrust bearing is provided so as to form a point bearing contact between the film holder and its supporting means. Specifically, the end of spindle 35 has a rounded head 38 bearing against the flat end wall 30 of axial hole 29. The clearance between the end of film core 26 and casing cover 24 insures that all of the axial thrust will be exerted upon the point contact between said rounded head 38 and flat end wall 30. As a result, the film core 26 and film coil 31 may rotate freely within the film magazine in spite of the axial thrust exerted on core 26 by the driving assembly of the driving means.

The plane surface frictional engagement between driving part 20 and surface 33 of film core 26 will also provide the slip connection between the driving means and film holder and renders such form of the invention preferable. However, the antifriction thrust bearing for the film holder is also advantageous even though there is a positive driving connection between the driving means and the film holder. Such a positive connection is illustrated in Fig. 3 and will now be described. The driving assembly of the driving means, as before, comprises a shaft 17 journalled in a bushing 18 mounted in mechanism plate 14 and a pinion gear 19. However, the driving part now comprises a disc 39 and a circular spring member 40 both attached to shaft 17 by a screw 41. Spring member 40 includes a pair of arms 42 normally extending into magazine chamber 11.

The detachable film holder may again be in the form of a film magazine composed of a side wall 22 having a ring 28 and a cover 24 carrying a spindle 35 with a rounded head 38. The film core 26 carries film coil 31, is provided at one end with an axial hole 29 having a flat end wall 30 and is provided at the other end with an annular groove 27 interengaging with said ring 28.

However, the driven part 32 extending through opening 25 has one or more teeth 43 which are positively engaged by the arms 42 of spring member 40. The leaf spring 36 on housing cover 12 urges the driven part 32 of the film holder toward spring member 40 of the driving means so that arms 42 engage teeth 43. Said arms 42, at the same time, exert an axial thrust upon film core 26 and also act upon the anti-friction thrust bearing for the film holder.

It should be noted that said anti-friction thrust bearing is quite advantageous in resisting with only negligible friction the axial thrust created by both types of driving clutches. Other variations of the invention will be suggested to those skilled in the art and the invention is defined by the appended claims.

We claim:

1. In a motion picture apparatus, the combination with a supporting spindle having an antifriction end, and a film holder having on one end an engageable face, provided in its other end with an axial bore for fitting over said spindle, and having a flat wall closing the inner end of said bore, of a driving means including a rotatable driven part mounted for axial movement into driving engagement with the face on said film holder, axial movement of the film holder by said driving means being limited by the single point contact between the antifriction end of said spindle and the flat wall in said film holder.

2. In a motion picture apparatus provided with a magazine chamber, the combination with a clutch member mounted for rotatable and axial movement and having a plane driving surface within said magazine chamber, and an actuating means operatively connected to said clutch member for moving the same axially toward said magazine chamber, of a film magazine having a side wall provided with an opening and containing a film core with a plane surface available through said opening for engagement by the plane driving surface of said clutch member when the magazine is positioned within said chamber, and a thrust bearing between said magazine and said film core and adapted without appreciable friction to prevent axial movement of said film core by said clutch member.

3. In a motion picture apparatus provided with a magazine chamber, the combination with a clutch member mounted for rotatable and axial movement and having a plane driving surface within said magazine chamber, and an actuating means operatively connected to said clutch member for moving the same axially toward said magazine chamber, of a film magazine having a side wall provided with an opening and containing a film core with a plane surface available through said opening, a resilient means engaging said film magazine to position it within said chamber with the plane surfaces of said film core and clutch member in frictional driving engagement, and a thrust bearing between said magazine and said film core and adapted without appreciable friction to prevent axial movement of said film core by said clutch member.

4. In a motion picture apparatus provided with a magazine chamber, the combination with a clutch member mounted for rotatable and axial movement and having a driving part within said magazine chamber, and a resilient means engaging said clutch member normally to urge its driving part into said chamber, of a film magazine having a side wall provided with an opening, containing a film core with a driven part, and a spindle fitting into an axial hole in said film core and for supporting the same with its driven part at said opening for engagement by the driving part of said clutch member when the magazine is in said chamber, and an antifriction thrust bearing composed of a flat end wall for said axial hole and integral with the film core, and a rounded end on said spindle.

5. In a film magazine, the combination with a casing having a wall provided with an opening, a film core within said casing provided with an axial bore and having a flat wall at the inner end of said bore, and a spindle in said casing, fitting into said axial bore, constituting the sole support for said film core, and for rotatably supporting said film core opposite said opening, of an antifriction end on said spindle for making a single contact with said flat wall at the inner end of said axial bore and for limiting axial movement of said film holder toward said spindle member.

6. In a film magazine, the combination with a casing having a wall provided with an opening, a film core within said casing, provided with an axial bore and having an integral flat wall at the inner end of said bore, and a spindle in said casing, fitting into said axial bore, constituting the only support for said film core, and for rotatably supporting said film core opposite said opening, of a rounded end on said spindle for making a single point contact with said flat wall at the inner end of said axial bore and for limiting axial movement of said film holder toward said spindle member.

OTTO WITTEL.
CARTER J. HUGHEY.